(12) United States Patent
Rood

(10) Patent No.: US 6,617,015 B2
(45) Date of Patent: Sep. 9, 2003

(54) MOTOR VEHICLE SEAL ASSEMBLY AND METHOD OF MANUFACTURE

(75) Inventor: Kenneth W. Rood, Michigan Center, MI (US)

(73) Assignee: Hahn Elastomer Corporation, Plymouth, MI (US)

( * ) Notice: Subject to any disclaimer, the term of this patent is extended or adjusted under 35 U.S.C. 154(b) by 0 days.

(21) Appl. No.: 09/884,770

(22) Filed: Jun. 19, 2001

(65) Prior Publication Data

US 2001/0031351 A1 Oct. 18, 2001

Related U.S. Application Data

(63) Continuation of application No. 09/198,993, filed on Nov. 23, 1998, now abandoned.

(51) Int. Cl.[7] .................................................. B32B 3/26
(52) U.S. Cl. ................................ 428/304.4; 428/319.3; 428/319.7; 428/122; 428/83; 428/358; 428/318.8; 428/318.6; 428/159; 428/308.4
(58) Field of Search ........................... 428/308.4, 319.3, 428/319.7, 122, 83, 358, 318.8, 318.6, 159, 304.4

(56) References Cited

U.S. PATENT DOCUMENTS

| | | | |
|---|---|---|---|
| 4,188,765 A | | 2/1980 | Jackson |
| 4,232,081 A | | 11/1980 | Pullan |
| 4,442,156 A | | 4/1984 | Yamaguchi |
| 4,472,469 A | | 9/1984 | Thies |
| 4,506,037 A | * | 3/1985 | Suzuki et al. ................ 427/180 |
| 4,508,669 A | * | 4/1985 | Iwai et al. ................... 264/345 |
| 4,898,760 A | | 2/1990 | Halberstadt et al. |
| 4,970,102 A | | 11/1990 | Guillon |
| 5,312,672 A | * | 5/1994 | Dittmeier et al. ........... 428/192 |
| 5,411,785 A | * | 5/1995 | Cook .......................... 428/122 |
| 5,527,583 A | * | 6/1996 | Nozaki et al. ............ 296/146.9 |
| 5,681,868 A | * | 10/1997 | Waldenberger et al. ..... 521/126 |
| 5,770,632 A | * | 6/1998 | Sekhar et al. .............. 521/41.5 |

FOREIGN PATENT DOCUMENTS

GB        1214890      * 12/1970

* cited by examiner

Primary Examiner—Terrel Morris
Assistant Examiner—Hai Vo
(74) Attorney, Agent, or Firm—Reising, Ethington, Barnes, Kisselle, P.C.

(57) ABSTRACT

A motor vehicle has a first body part with a seal support flange thereon that supports a unitary seal construction having a flexible bulb seal portion engageable with second vehicle body part including a hood or other vehicle body part for sealing against leakage between the first and second vehicle body parts and an integrally formed base portion and wherein the flexible bulb seal is hollow and is formed of a soft low density thermoplastic foam and the integrally formed base portion is integrally extruded with the flexible bulb seal and is formed solely from polymeric material having spaced walls defining a recess for fitting the unitary seal construction in place on the support flange.

31 Claims, 4 Drawing Sheets

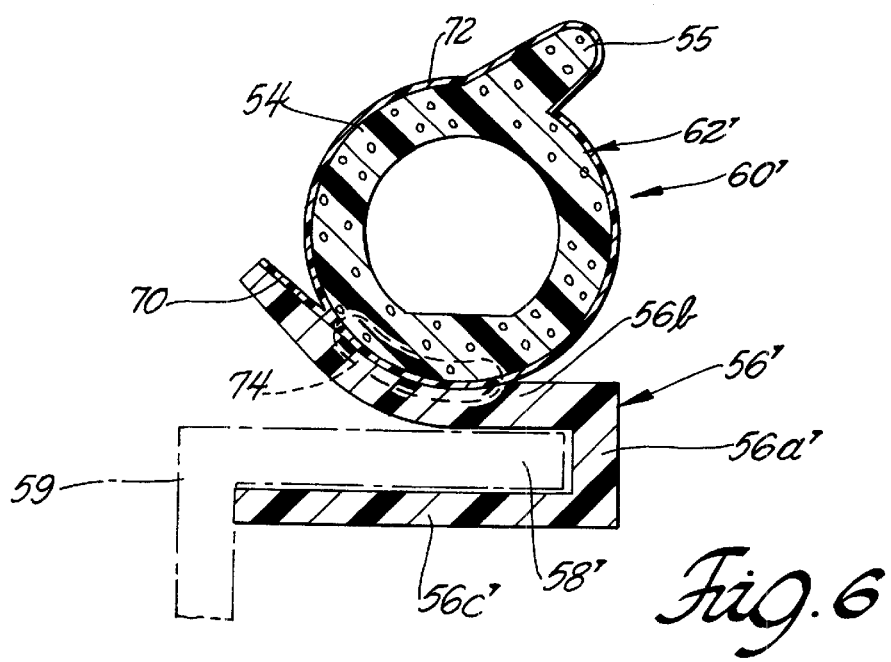
Fig. 6
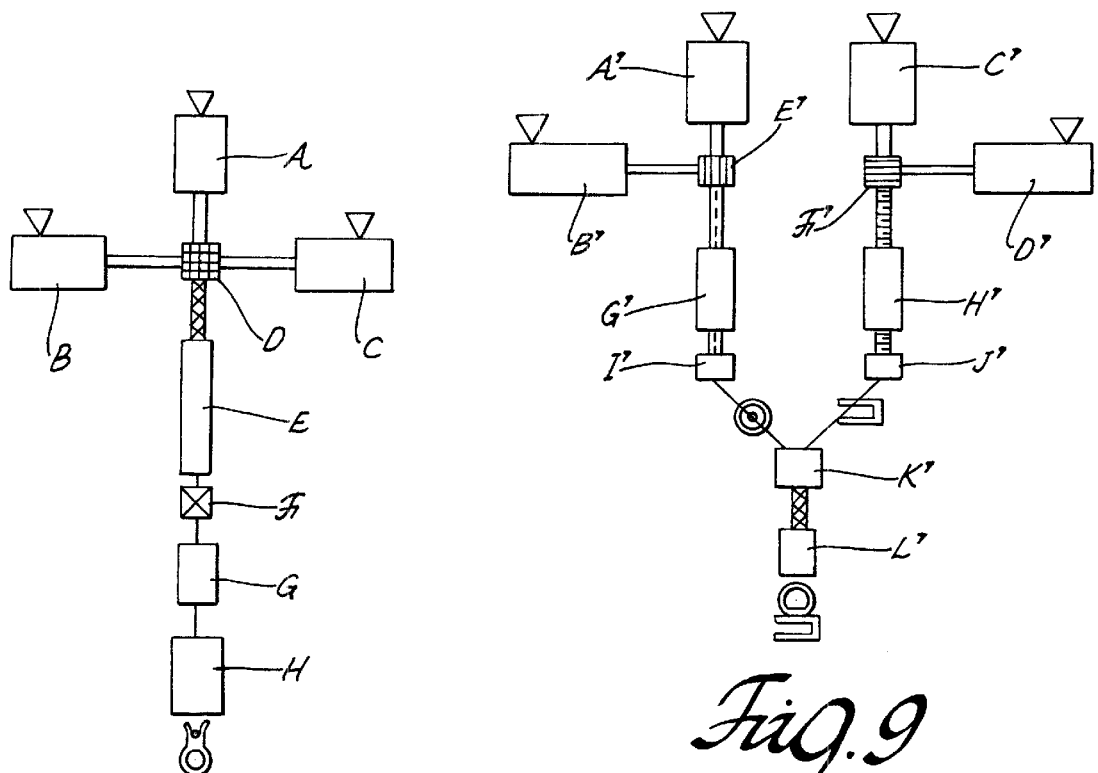
Fig. 8
Fig. 9

MOTOR VEHICLE SEAL ASSEMBLY AND METHOD OF MANUFACTURE

This a continuation of the application having Ser. No. 09/198,993 filed Nov. 23, 1998, abandoned.

This invention relates to a motor vehicle including first and second body parts having a resilient water seal supported there between and including a seal component that is compressed between the first and second body parts and a seal support that is connected to one of the first and second body parts and to its method of manufacture.

BACKGROUND OF THE INVENTION

Body seals for sealing between first and second body parts for motor vehicles have been configured in a manner that has added weight to the vehicle or have been difficult to recycle because they have included metal inserts and the like to provide rigidity that eases the connection of the seal in place within the vehicle assembly.

Examples of sealing strips with metal inserts are shown in U.S. Nos. 4,118,765 and 4,472,469. Such inserts add to the weight of the sealing strips and prevent such sealing strips from meeting requirements for height compression when two relatively moveable vehicle parts are closed to effect a water tight seal there between.

It is also known to provide seal bulbs and base portions that are formed as separate parts and are joined together to form a strip seal assembly. Such seal assemblies also include a metal insert in the base for added rigidity to ease assembly. Moreover, such strip seal assemblies are typically formed from a solid elastomeric material such as cured rubber or EPDM rubber. In such arrangements the metal insert shapes a female configured base that attaches to a post when the seal is assembled within the vehicle.

Additionally, it is known to provide a co-extruded seal for use in sealing window frames wherein a blown foam material is shaped to form a solid low density seal of light weight. An example of such a seal is set forth in U.S. Pat. No. 4,898,760 wherein the blown material is extruded with one or two legs. A low friction cover material is then connected by adhesive to the blown material. In the two leg version, the legs are joined to form a hollow bulb portion that is then covered by the covering material and then the bulb and covering material are connected to a stiffener part for assembling the blow foam seal to a window frame.

While suitable for their intended purpose none of the aforesaid seal assemblies meet recycling and weight reduction objectives that are desired by motor vehicle manufacturers.

SUMMARY OF THE INVENTION

According to the present invention these objectives are met in a seal assembly having multi-extrusions having three or more elements configured to meet compression requirements and ease of assembly requirements while reducing weight and providing recycling.

An object of the invention is to provide a process for making such a multi-extrusion assembly wherein the multi-extrusions are formed by more than one die and are joined by in-line fusion welding.

A further object of the invention is to provide a unitary tripartite seal construction that comprises a flexible foamed seal, a base of rigid plastic and an attachment there between made from a compatible plastic material and wherein the foamed seal, base and attachment are formed together in a continuous extrusion process.

A further object of the invention is to provide a unitary quad-partite seal construction that comprises a flexible foamed seal, a base, a skin coat and a tie-bond layer there between made from a compatible plastic material and wherein the foamed seal, base and the bond layer are formed together in a continuous extrusion process.

Yet another object is to provide such a quad-partite seal wherein the tie-bond layer is TPE or TPE with a blowing agent.

A further object is to configure the attachment as a bar.

A still further object is to configure the attachment as a bar having a variable width with the greatest width being at the point of attachment to said flexible foamed seal.

A further object of the invention is to provide such seal constructions wherein the parts are joined by co-extrusion and the base and attachment part are the same materials.

A further object of the invention is to provide such a tripartite seal construction wherein the parts are joined by tri-extrusion and the base and attachment part are made of different materials.

Another object is to provide such seal constructions having a base formed solely from polymeric material and wherein the base has spaced sides with a bight portion co-extruded with said seal portion and including wing members and wherein the spaced sides have inner walls containing an adhesive bead that flows over a support member as a thin bond layer to provide intimate contact and adhesion between the base and the support member.

Yet another object is to provide such seal constructions wherein the spaced sides of the base are biased together to clamp against a support member located there between.

A still further object of the invention is to provide such a seal construction that comprises a flexible foamed seal, a base of rigid plastic and an attachment there between made from a compatible plastic material and wherein the foamed seal, base and attachment are formed together as a unitary piece in a continuous extrusion process and wherein an additional extrusion is applied as a coating material on part or all of the exterior perimeter of the flexible foamed seal.

A feature of the invention is to provide such a seal construction with a flexible foamed seal wherein the soft low density thermoplastic foam includes a water blowing agent.

Another feature is to provide such seal constructions wherein the low density thermoplastic foam is a thermoplastic elastomer having a dry blowing agent.

Still another feature is to provide such seal constructions having low density thermoplastic foam of thermoplastic elastomer having blowing agents such as CFC-11; water injected into a polymer melt; water chemically bonded to a carrier dispersed in a polymer melt; endothermic solids that release $N_2$ or $CO_2$ at processing temperatures; or gases injected into the process stream or combinations of such blowing agents.

Yet another feature of the invention is to provide such seal constructions wherein the soft low density thermoplastic foam is a thermoplastic flexible synthetic polymer such as thermoplastic vulcanizates (TPV's); thermoplastic polyolefins (TPO's); ionomer resins, such as Surlyn; flexible PVC resins; thermoplastic elastomers (TPE's); flexible polyurethane polymers and the base is a rigid thermoplastic such as polypropylene; filled polypropylene; talc-filled polypropylene; polyethylene; high density polyethylene; polystyrene; PVC resins; ABS resins; TPO resins; Nylon resins; Metallocene polymers or a flexible thermoplastic material such as thermoplastic vulcanizates (TPV's); thermoplastic polyolefins (TPO's); ionomer resins, such as Surlyn; flexible PVC resins; thermoplastic elastomers (TPE's); flexible polyurethane polymers, the seal construction is characterized by the soft-low-density thermoplastic elastomer foam being a thermoplastic elastomer having a density in the range of 20–60 pounds per cubic foot.

Another object of the present invention is to provide a unitary seal construction having a flexible hollow bulb seal portion and an integrally formed base portion wherein the flexible bulb seal is formed of a soft low density thermoplastic foam with a continuous annular cross-section integrally extruded with a base portion formed solely from polymeric material and has spaced walls defining a recess for connection to a support member.

Another object of the invention is to provide a unitary seal construction having a flexible hollow bulb seal portion and an integrally formed base portion wherein the flexible bulb seal is formed of a soft low density thermoplastic foam with a continuous annular cross-section integrally extruded with a base portion formed solely from polymeric material and has spaced walls defining a recess for connection to a support member wherein the base is connected to the seal portion by a tri-extruded layer of joining material formed from thermoplastic elastomer including a foaming agent.

Another object of the invention is to provide a unitary seal construction having a flexible hollow bulb seal portion and an integrally formed base portion wherein the flexible bulb seal is formed of a soft low density thermoplastic foam with a continuous annular cross-section integrally extruded with a base portion formed solely from polymeric material and wherein the base has spaced sides with a bight portion co-extruded with said seal portion and including wing members and wherein the spaced sides have inner walls containing an adhesive bead that flows over a support member as a thin bond layer to provide intimate contact and adhesion between the base and the support member.

A further object of the invention is to provide the seal construction of the preceding object wherein the spaced sides have outwardly flared piloting ends thereon.

Another object of the invention is to provide a unitary seal construction having a flexible hollow bulb seal portion and an integrally formed base portion wherein the flexible bulb seal is formed of a soft low density thermoplastic foam with a continuous annular cross-section integrally extruded with a base portion formed solely from polymeric material and wherein the base has spaced sides with a bight portion co-extruded with said seal portion and including wing members and wherein the spaced sides have inner walls that are biased together to clamp against a support member located there between wherein the base has sides formed laterally of the seal portion.

Another object of the invention is to provide a unitary seal construction having a flexible hollow bulb seal portion and an integrally formed base portion wherein the flexible bulb seal is formed of a soft low density thermoplastic foam with a continuous annular cross-section integrally extruded with a base portion formed solely from polymeric material and wherein the base has spaced sides with a bight portion co-extruded with said seal portion and including wing members and wherein the spaced sides have inner walls that are biased together to clamp against a support member located there between wherein the base has sides formed laterally of the seal portion and one of the sides is formed tangentially of the seal portion.

Another object of the invention is to provide a unitary seal construction having a flexible hollow bulb seal portion and an integrally formed base portion wherein the flexible bulb seal is formed of a soft low density thermoplastic foam with a continuous annular cross-section integrally extruded with a base portion formed solely from polymeric material and wherein the base has spaced sides with a bight portion co-extruded with said seal portion and including wing members and wherein the spaced sides have inner walls that are biased together to clamp against a support member located there between wherein the base has sides formed laterally of the seal portion and wherein one of said sides is formed outboard of said seal portion as one side of an L-shaped extrusion.

Another object of the invention is to provide a unitary seal construction having a flexible hollow bulb seal portion and an integrally formed base portion wherein the flexible bulb seal is formed of a soft low density thermoplastic foam with a continuous annular cross-section integrally extruded with a base portion formed solely from polymeric material and wherein the base has spaced sides with a bight portion co-extruded with said seal portion and including wing members and wherein the spaced sides have inner walls that are biased together to clamp against a support member located there between wherein the base has sides formed parallel to a center vertical axis through the seal portion.

Another object of the invention is to provide a unitary seal construction having a flexible hollow bulb seal portion and an integrally formed base portion wherein the flexible bulb seal is formed of a soft low density thermoplastic foam with a continuous annular cross-section integrally extruded with a base portion formed solely from polymeric material and wherein the base has spaced sides with a bight portion co-extruded with said seal portion and including wing members and wherein the spaced sides have smooth inner walls that are biased together to clamp against a support member located there between wherein the base has sides formed on either side of to a center vertical axis through said seal portion and forming a wedge configured recess for connection to the support.

A further object of the invention is to add a layer of material to the outer perimeter of the hollow bulb as a tri-extrusion of similar or different materials which can either provide a more damage resistant surface coat, or provide a surface coat with slip properties or friction properties to accommodate different application requirements.

A still further object is to provide a process for forming a seal construction of the invention by providing three or more extrusion machines for separately forming foamed polymeric material; a coating material and a rigid or semi-rigid polymer material and simultaneously feeding such materials through one or more dies to form a unitary seal having a flexible cellular bulb; a rigid or semi-rigid base and a cover of coating material.

A further object is to provide a process for forming a seal construction of the invention by providing one or more dies and extruding a foamed polymeric material and coating material in one die to form a seal bulb with a surface coat and extruding a rigid or semi-rigid polymeric material in another die to form a base and thereafter fusion welding the seal bulb to the base.

These and other objects, advantages and features of the present invention will become more apparent from the following specification when taken with the accompanying drawings wherein:

BRIEF DESCRIPTION OF THE DRAWINGS

FIG. 6 is an enlarged cross-sectional view of still another embodiment of the invention;

FIG. 8 is a diagrammatic view of apparatus for forming a tripartite extrusion according to the invention; and FIG. 9 is a diagrammatic view of apparatus for forming a quad-partite extrusion according to the invention.

DESCRIPTION OF PREFERRED EMBODIMENTS

Figure 1:
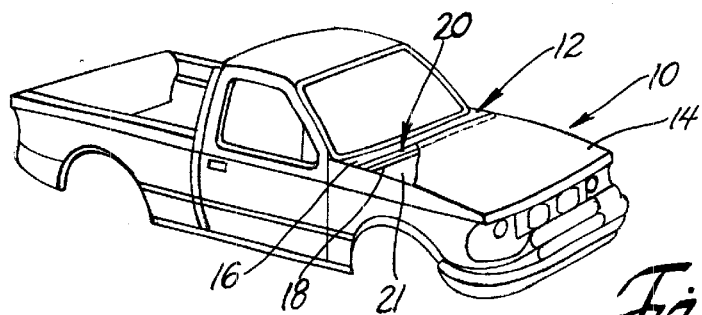
FIG. 1 is a perspective view of a motor vehicle including the seal construction of the present invention.

Referring now to FIG. 1, a motor vehicle 10 is illustrated having a cowl 12 and a hood 14. The cowl 12 includes an upper surface 16 carrying a support member 18 having a seal construction 20 of the present invention secured thereto for sealing an engine compartment 22 when the hood 14 is closed.

The seal construction 20 is configured to be easily assembled on the support member 18 merely by connecting the base 22 of the seal construction onto the support member 21 in clamping relationship therewith.

In accordance with one aspect of the present invention the seal construction 20 is comprised solely of plastic material and preferably of thermoplastic elastomer material so that it can be easily recycled.

Figure 2:
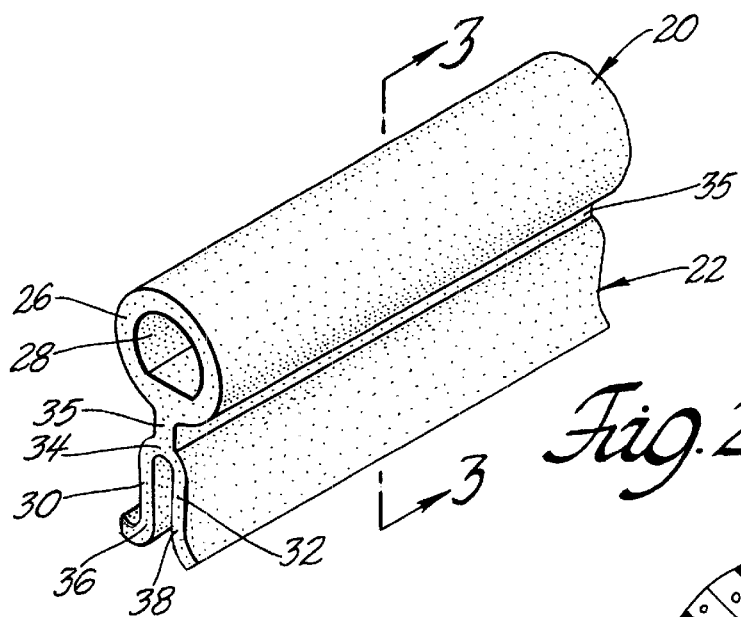
FIG. 2 is an enlarged perspective view of a segment of a seal strip used in the seal construction shown in FIG. 1.
Figure 3:
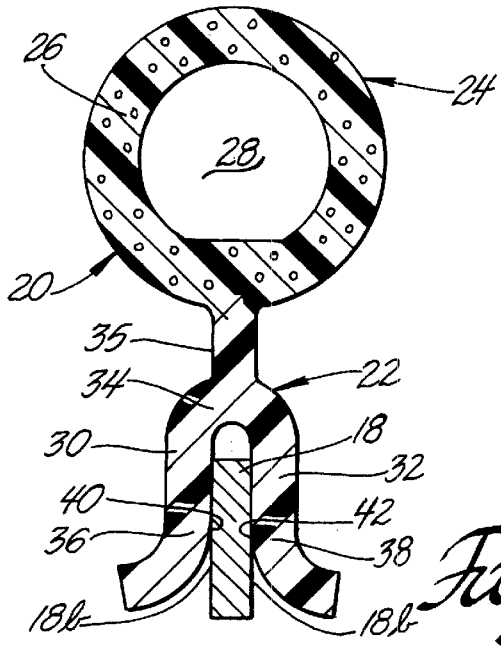
FIG. 3 is an enlarged cross-sectional view taken along the line 3—3 of FIG. 1 looking in the direction of the arrows.

In the preferred embodiment shown in FIGS. 1–3, the seal construction 20 has a hollow bulb seal portion 24 that is coextruded with the base 22 to form a unitary member that does not require separate assembly or adhesion between the seal portion 24 and the base 22.

The hollow bulb seal portion 24 is formed of a soft low density thermoplastic foam with a cross-section including a continuous annular rim 26 that encloses a central opening 28 formed along the length of the strip defined by the seal construction 20. The annular rim 26 is integrally extruded with the base 22. The base 22 is formed solely from polymeric material. The base 22 has spaced sides 30, 32 with a bight portion 34 co-extruded with a rigid bar 35 connected to the rim 26 at a point in line with the center of the rim 26.

Figure 4:
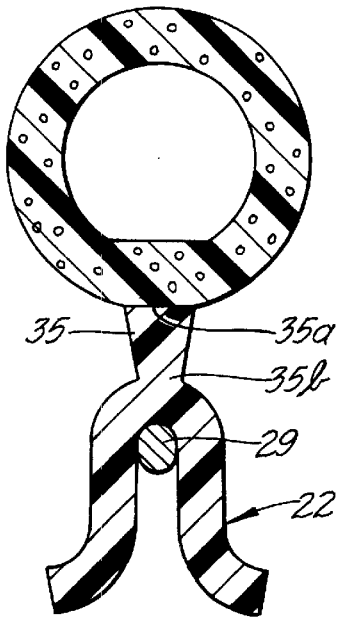
FIG. 4 is an enlarged cross-sectional view of another embodiment of the present invention.

In FIG. 4, the base 35 has an enlarged width at the end 35a connected to the rim 26 and a lesser width at the end 35b connected to the bright portion 34 of the base 22. Also, as will be described with respect to FIG. 8, if desired, a bead of adhesive material 29 can be provided with the base 22.

The spaced sides 30, 32 of base 22 includes inwardly directed wing portions 36, 38 with smooth internal walls 40, 42, respectively. The internal walls 40, 42 are biased inwardly so as to clamp against the sides 21a, 21b of the support member 18. In the preferred embodiment the sides are formed generally parallel to a center vertical axis through the seal portion 24 such that the seal construction 20 can be assembled on the support member 18.

The seal portion 24 by virtue of its foam construction and its geometry reduce the weight of strips seals of the type for sealing between first and second parts of a motor vehicle have a weight reduced by 20% to 60% in comparison to the usual solid seal of EPDM construction that is used currently in such applications.

The rigid bar 35 is formed from rigid plastic material preferably a thermoplastic elastomer such as polypropylene having a Rockwell hardness of 85–105 and a specific gravity of 0.95–0.98. Such material has sufficient rigidity to hold the soft, easily compressed seal portion along a substantial length that enables the seal construction be placed throughout its length in overlying relationship with a support flange and then pressed downwardly into clamped relationship therewith.

The rigid bar 35 enables a designer to change the height of the seal construction without changing the base 22 and without changing the compression and recovery characteristics of the seal portion 24. If, for example, the space between a cowl and a hood is increased, the only change required is an adjustment in the height of the rigid bar 35. Such change can be accomplished merely by changing the dimensions of an extrusion die.

Figure 10:
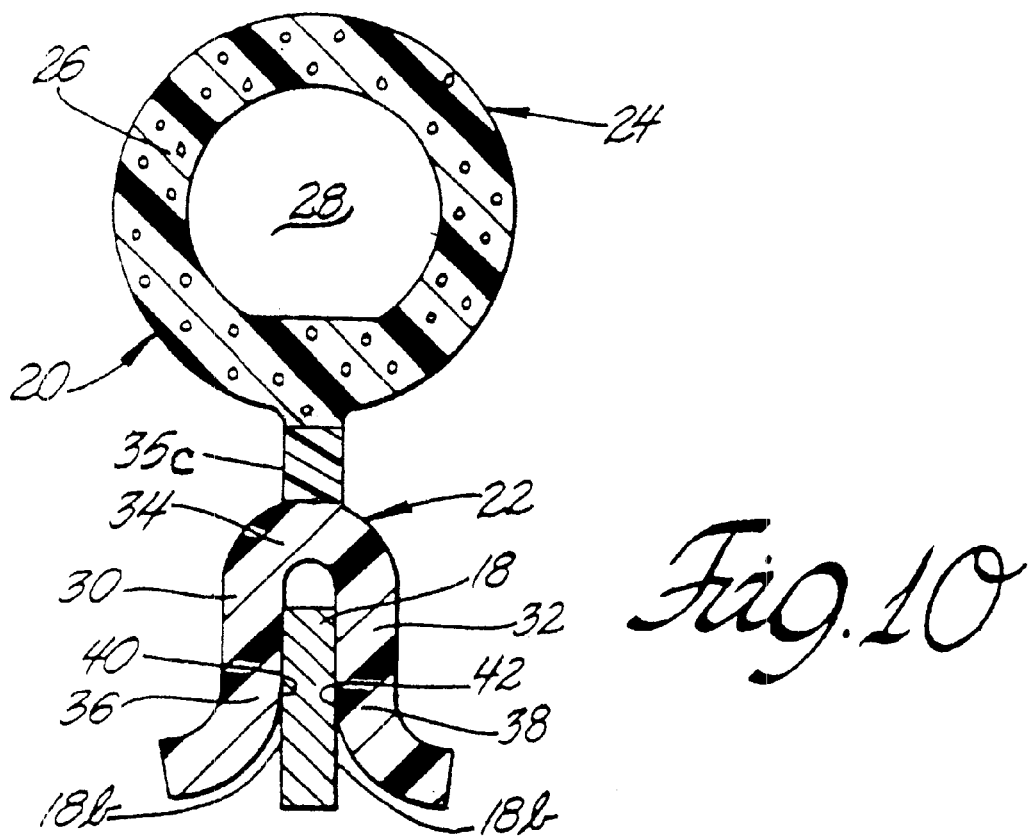
FIG. 10 is an enlarged cross-sectional view of another embodiment of the present invention.

In FIG. 10, rigid bar 35c uses a different plastic material from seal portion 24 and base portion 22.

The seal portion 24 has a hollow bulb configuration as described herein and is formed of a thermoplastic elastomeric material of blown foam material that is light weight. Suitable materials for the seal portion 24 include thermoplastic elastomers including thermoplastic olefins; thermoplastic olefin vulcanizates; styrene block copolymers; thermoplastic urethanes, copolyesters and copolyamides. These materials are processed through extruders with blowing agents including water injected into the polymer melt or water, which is chemically bound to a carrier, disbursed in the polymer and released during the processing at the processing temperature. Sarlink C-8175B manufactured by DSM; CFC11; and dry blowing agents such as endothermic solids which release gases such as $N_2$ or $CO_2$ at processing temperatures, such as Azodicarbonamides, Azovisformamides; or gases such as N2 or CO2 which are injected; or combinations of the aforesaid blow agents.

The resultant material has a low density characteristic that provides for compression and recovery characteristics that enable the seal portion 24 to seal over long periods of time and under a wide range of operating conditions found in motor vehicle and other applications. The seal construction is characterized by the soft low-density thermoplastic elastomer foam being a thermoplastic elastomer having a density in the range of 20–60 pounds per cubic foot.

Figure 5:
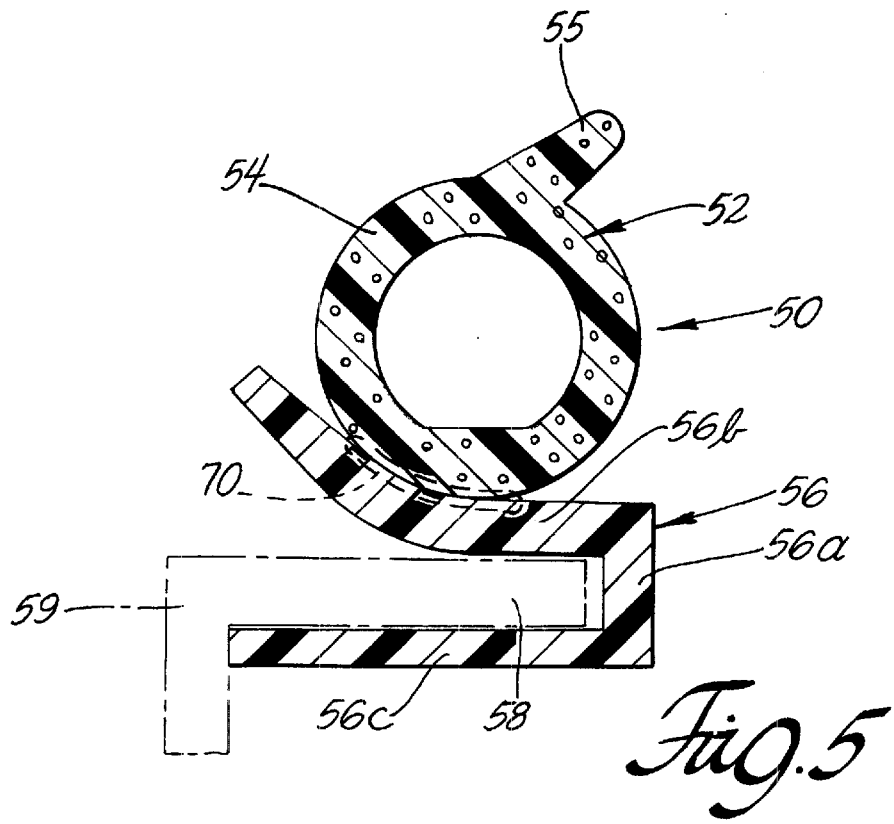
FIG. 5 is an enlarged cross-sectional view of still another embodiment of the present invention.

In the embodiment of the invention shown in FIG. 5, a seal construction 50 is shown including a seal portion 52 formed as a hollow bulb with an annular rim 54 and an integrally radially outwardly directed free standing sealing lip 55. The seal portion 52 is co-extruded with a more rigid base 56 formed as a U-shaped member having a bight portion 56a and two spaced legs 56b, 56c that form a retention recess 58 adapted to be secured to an L-shaped support member 59. In this embodiment the support member 59 can be formed across the width of a cowl member and the seal portion 52 is shaped to be compressed against a vehicle hood when closed. As in the prior embodiment, the seal portion is formed from a foamed thermoplastic elastomer such as Santoprene 121–68W228 supplied by AES Advanced Elastomer Company or Sarlink C-8175B supplied by DSM. The coextruded base 56 is preferably formed from a polypropylene material.

Another variant of this invention shown in FIG. 6 has a base 56' of polypropylene co-extruded with a covering tie layer 70 of a thermoplastic elastomer in a solid form. At the same time and proximate in space, a second co-extrusion of foamed thermoplastic elastomer 52' and a thing cover layer 72 of a low friction coating is produced. The two co-extrusions are joined by fusion welding at region 74, making a quad-partite assembly, which has a rigid base for attachment to a support member and an intimately adhered foam seal having a surface, which is impervious and lubricious. The tie layer 74 can be synthetic polymers which has an affinity for the materials to be joined; synthetic blends or alloys in which each of the polymers has an affinity to adhere to one of the materials to be joined. Examples include a melt processable rubber such as Alcyrn mixed with TPE material such as Santoprene 123-52-W242.

Figure 7:
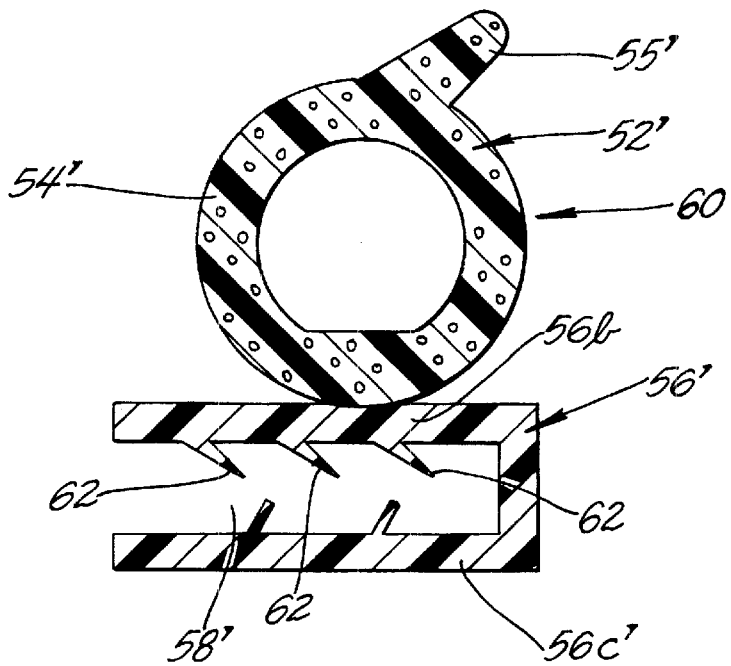
FIG. 7 is an enlarged cross-sectional view of still another embodiment.

In the embodiment of the invention shown in FIG. 7, a seal construction 60 is shown having the same general configuration as the embodiment in FIG. 5 and wherein like portions are designated with like reference numerals primed. The difference between the FIG. 5 and FIG. 7 embodiment is that the seal construction 60 is a tri-extrusion formed with retention vanes 62 of a third composition from that found in the seal portion 52' and in the base 56'. The retention ribs 62 are integrally formed on the inner surfaces of the spaced legs 56b' and 56c' and are formed to have free ends that are directed inwardly of the recess 58' to grip any support member inserted into the recess 58'. Such construction obviates the need to configure the legs to closely match the outer dimensions as would be the case with the embodiment shown in FIG. 4. The invention is directed towards a unitary tripartite seal construction that comprises a flexible foamed seal of low density thermoplastic elastomer foam, a base of rigid plastic and an attachment there between made from a compatible plastic material and wherein the foamed seal, base and attachment are formed as a continuous extrusion process. This seal construction may have an additional extrusion applied as a coating material on part or all of the exterior perimeter of the flexible foam seal. The coating material may be a wear resistant material from the group consisting of TPE Santropren 123-52-W242; polyurethane polymers; thermoplastic polyester; nylon resins; melt processable rubbers such as Alcryn; and TPE fluorocarbon. The coating material may also be comprised of a friction reducing material from the group consisting of TPE fluorocarbon; polyethylene; hi-density polyethylene; synthetic polymers which contain particulate lubricants such as powdered ultra high molecular weight polyethylene, powdered teflon, mica, graphite and/or molybdenum; and blends or alloys of synthetic polymers which contain particulate lubricants.

WORKING EXAMPLES

As shown in FIG. 8, a flexible synthetic resin comprising a mixture of a thermoplastic elastomer of Shore A hardness 68 and particulate filler which will release water during the extrusion process is fed into extruder A. The mixture heated to a processing temperature of 420° F. At the same time, a second resin such as a semi-rigid thermoplastic elastomer having a Shore D hardness of 50 is placed in extruder B and heated to a processing temperature of 370° F. At the same time, a third resin, which has a quality such as friction and/or wear resistance is placed in extruder C and heated to a processing temperature of 400° F.

By simultaneously operating the three extruding machines, the three materials are transferred to and cohered within a die (D) to immediately form a flexible cellular bulb; and a bight semi-rigid base with a lubricious film formed over the exterior periphery of the extrusion. The film has a thickness of 0.01 to 0.10 mm. The complex extrusion was then passed through a cooling tank (E) and through a puller (F), followed by passage through an adhesive bead application station (G) and a cut-to-length station (H).

As shown in FIG. 9, a mixture of flexible synthetic resin comprising a thermoplastic elastomer of Shore A hardness 68 and water are fed into extruder A' and heated to a processing temperature of 350° F. At the same time, a second resin which has a wear and/or friction reduction quality is placed in extruder B' and heated to a processing temperature of 400° F. By simultaneously operating the two extruding machines, the two materials are transferred and cohered within a die E' to immediately form a flexible cellular bulb coated with a lubricious film over the circumference or periphery of the cellular bulb. The film has a thickness of 0.01 to 0.10 mm. The coated bulb is then passed through a cooling station G' and through a puller I'.

At the same time, a thermoplastic resin, such as polypropylene with a Rockwell hardness of 95, is placed in extruder C' and heated to a processing temperature of 400° F., while a second resin, a thermoplastic elastomer having a Shore A hardness 68, is placed in extruder D' and heated to a processing temperature of 370° F. By simultaneously operating the two (C' and D') extruding machines, the two materials are transferred and cohered within die F' to immediately form a rigid base which includes an L-shaped member having a batten strip of flexible polymer along its longitudinal axis. The intimately adhered base is then passed through a cooling stations H' and through a puller J'.

By then simultaneously passing the coated bulb and the base with its batten strip proximate to the coated bulb through fusion-welding stations K', a one-piece quad-partite extrusion having superior adhesion quality is formed and cut to required length in cutter L'.

While the seal constructions of the present invention have been shown located between vertically spaced vehicle body components such as a cowl and a hood they are applicable for sealing along laterally spaced members, horizontally spaced members and are applicable to body parts that are not necessarily separable as in the case of a moveable hood and a fixed cowl member.

Thus, it is seen that the invention has a wide application in which seal strips of light weight and a single unitary construction can be used in motor vehicle sealing applications. While shown with respect to motor vehicle applications, the seal strips of the present invention also have application in domestic appliance and other applications where an easily assembled, light weight seal could be used.

The embodiments of the invention in which an exclusive property or privilege is claimed are defined as follows.

What is claimed is:

1. A seal construction which is an extrusion comprised of a single unitary extruded member having a first seal portion configured as a flexible low-density foam seal, a second base portion configured as a base of rigid plastic and a third attachment portion joining the rigid plastic and the low density foam seal; the third portion is a bar comprised of a rigid thermoplastic material made of material differing from that of the first and second portions.

2. The seal construction of claim 1 wherein said attachment is a bar having a variable width with the greatest width being at the point of attachment to said flexible foamed seal.

3. The seal construction of claim 1 where in said base is formed solely from polymeric material and wherein said base has spaced sides with a bight portion co-extruded with said flexible foamed seal and spaced sides have inner walls containing an adhesive bead that flows over a support member as thin bond layer to provide intimate contact and adhesion between the base and the support member.

4. The seal construction of claim 1 wherein said base is formed solely from polymeric material and wherein said base has spaced sides with a bight portion co-extruded with foamed seal portion and including wing members and wherein the spaced sides have smooth inner walls that are biased together to clamp against a support member located there between.

5. The seal construction of claim 1 wherein an additional extrusion is applied as a coating material on part or all of the exterior perimeter of said flexible foamed seal.

6. The seal construction of claim 5, wherein said coating material is a wear resistant material selected from the group consisting of TPE; polyurethane polymers; thermoplastic polyester; nylon resins; melt processable rubbers; and TPF fluorocarbon.

7. The seal construction of claim 6 wherein said coating material is a friction reducing material from the group consisting of TPE fluorocarbon; polyethylene; hi-density polyethylene; synthetic polymers which contain particulate lubricants such as powdered ultra high molecular weight polyethylene, powdered teflon, mica, graphite and/or molybdenum; and blends or alloys of synthetic polymers which contain particulate lubricants.

8. The seal construction of claim 1 wherein said soft low-density thermoplastic elastomer foam is made from a water blowing agent.

9. The seal construction of claim 8 wherein said base is a thermoplastic elastomer.

10. The seal construction of claim 8 wherein said base is polypropylene.

11. The seal construction of claim 8 wherein said base is a thermoplastic elastomer having a specific gravity between 0.3–0.6.

12. The seal construction of claim 11 wherein said base is connected to said flexible bulb seal by a tri-extruded layer of joining material formed from thermoplastic elastomer including a foaming agent.

13. The seal construction of claim 8 wherein said base has spaced sides with a bight portion co-extruded with said flexible bulb seal.

14. The seal construction of claim 13 wherein said spaces sides have outwardly flared piloting surfaces thereon.

15. The seal construction of claim 13 wherein said base has sides formed laterally of said flexible bulb seal.

16. The seal construction of claim 13 wherein said base has sides formed laterally of said flexible bulb seal and wherein one of said sides is formed tangentially of said flexible bulb seal.

17. The seal construction of claim 13 wherein said base has sides formed laterally of said flexible bulb seal and wherein one of said sides is formed outboard of said seal portion as one side of an L-shaped extrusion.

18. The seal construction of claim 13 wherein said base has sides formed parallel to a center vertical axis through said flexible bulb seal.

19. The seal construction of claim 13 wherein said base has sides formed on either side of to a center vertical axis through said flexible bulb seal and forming a wedge configured recess for connection to the support.

20. The seal construction of claim 1 wherein said soft low density thermoplastic elastomer foam is a thermoplastic elastomer made from a dry blowing agent.

21. The seal construction of claim 20 wherein said soft low density thermoplastic elastomer foam is a thermoplastic elastomer made from a dry blowing agent selected from the group consisting of endothermic solids which release gases such as $N_2$ or $CO_2$ at processing temperatures; Azodicarbonamids and Azovisformamides.

22. The seal construction of claim 1 wherein said soft low density thermoplastic elastomer foam is a thermoplastic elastomer having a density in the range of 20–60 pounds per foot cubed.

23. The seal construction of claim 1 wherein said soft low-density thermoplastic foam is a thermoplastic elastomer co-extruded with said base.

24. The seal construction of claim 1 wherein said base has sides formed parallel to a center vertical axis through said flexible bulb seal.

25. A method for making a tripartite seal comprising:
providing a die having first, second and third regions for forming, respectively, a bulb seal, a rigid base and a connection there between;
providing first, second and third plastic materials;
and coextruding the first, second and third plastic materials, respectively through said first, second and third regions for forming a three-piece integral seal assembly.

26. The method of claim 25 wherein said first material is further characterized as soft low-density thermoplastic elastomer foam.

27. The method of claim 26 wherein said first material is further characterized as having a density in the range of 20–60 lbs./ft. squared.

28. The method of claim 26 wherein said third material is further characterized by being a thermoplastic elastomer.

29. The method of claim 28 wherein said third material is still further characterized as being polypropylene.

30. The method of claim 28 wherein said third material is still further characterized as a thermoplastic elastomer having a specific gravity between 0.3–6.

31. The method of claim 28 wherein said second material is further characterized as a thermoplastic elastomer including a foaming agent.

* * * * *

UNITED STATES PATENT AND TRADEMARK OFFICE
CERTIFICATE OF CORRECTION

PATENT NO.   : 6,617,015 B2
DATED        : September 9, 2003
INVENTOR(S)  : Rood It is certified that error appears in the above-identified patent and that said Letters Patent is hereby corrected as shown below:

Column 9,
Line 19, replace "6" with -- 5 --.
Line 37, replace "11" with -- 8 --.

Column 10,
Lines 28-37, replace claim 25 with -- A method for making a tripartrite seal which is an extrusion comprised of a single unitary extruded member having a first seal portion configured as a flexible lower density foam seal, a second base portion configured as a base of rigid plastic and a third attachment portion joining the rigid plastic and the low density foam seal; the third portion is a bar comprised of a rigid thermoplastic material made of material differing from that of the first and second portions comprising:
    providing a die having a first, second and third regions for forming, respectively, a bulb seal, a rigid base and a connection there between;
    providing first, second, and third materials;
    and coextruding the first, second and third plastic materials, respectively through said first, second and third regions for forming a three-piece integral seal assembly. --

Signed and Sealed this

Twentieth Day of January, 2004

JON W. DUDAS
*Acting Director of the United States Patent and Trademark Office*